United States Patent [19]

Carpenter et al.

[11] Patent Number: 5,667,159
[45] Date of Patent: Sep. 16, 1997

[54] TRIP SYSTEM FOR A BAIL ASSEMBLY ON A FISHING REEL

[75] Inventors: Robert L. Carpenter, Tulsa, Okla.; John A. Zurcher, St. Charles, Mo.; John W. Puryear, Biloxi, Miss.; Hyunkyu Kim, Incheon, Rep. of Korea

[73] Assignee: Zebco Div. of Brunswick Corporation, Tulsa, Okla.

[21] Appl. No.: 336,484

[22] Filed: Nov. 9, 1994

Related U.S. Application Data

[63] Continuation-in-part of Ser. No. 914,260, Jul. 15, 1992.
[51] Int. Cl.⁶ ............................................. A01K 89/01
[52] U.S. Cl. .................................. 242/233; 242/232
[58] Field of Search ................................ 242/230, 231, 242/232, 233

[56] References Cited

U.S. PATENT DOCUMENTS

| | | |
|---|---|---|
| 4,921,187 | 5/1990 | Yamaguchi et al. .................. 242/232 |
| 4,932,616 | 6/1990 | McMickle et al. .................... 242/233 |
| 5,312,067 | 5/1994 | Sugawara et al. ..................... 242/232 |

*Primary Examiner*—Katherine Matecki
*Attorney, Agent, or Firm*—Wood, Phillips, VanSanten, Clark & Mortimer

[57] ABSTRACT

A fishing reel having a frame, a rotor mounted to the frame for rotation about a first axis, a line storage spool, structure for rotating the rotor, a bail assembly on the rotor having first and second bail arms mounted to the rotor for pivoting movement between (a) a first position wherein the bail assembly is in a retrieve position so that the bail directs line onto the line storage spool as the rotor is rotated and (b) a second position wherein the bail assembly is in a cast position, a trip link mounted to the rotor for movement relative to the rotor between third and fourth positions, cooperating structure on the bail assembly and trip link for moving the trip link from its third position into its fourth position as an incident of the bail assembly moving from its first position into its second position, and a trip link actuator on the reel frame and defining a shoulder that intercepts the trip link with the trip link in its fourth position and the rotor rotating in a first rotational direction about its axis and moves the trip link from its fourth position towards its third position. The cooperating structure on the bail assembly and trip link includes a structure for moving the bail assembly from its cast position towards its retrieve position as an incident of the trip link moving from its fourth position into its third position. The trip link structure allows repositioning of the trip link relative to the rotor in the event that the trip link encounters the trip link actuator as the trip link moves from its third position towards its fourth position to thereby prevent jamming of the trip link by the trip link actuator and allow the trip link to move fully into its fourth position.

20 Claims, 7 Drawing Sheets

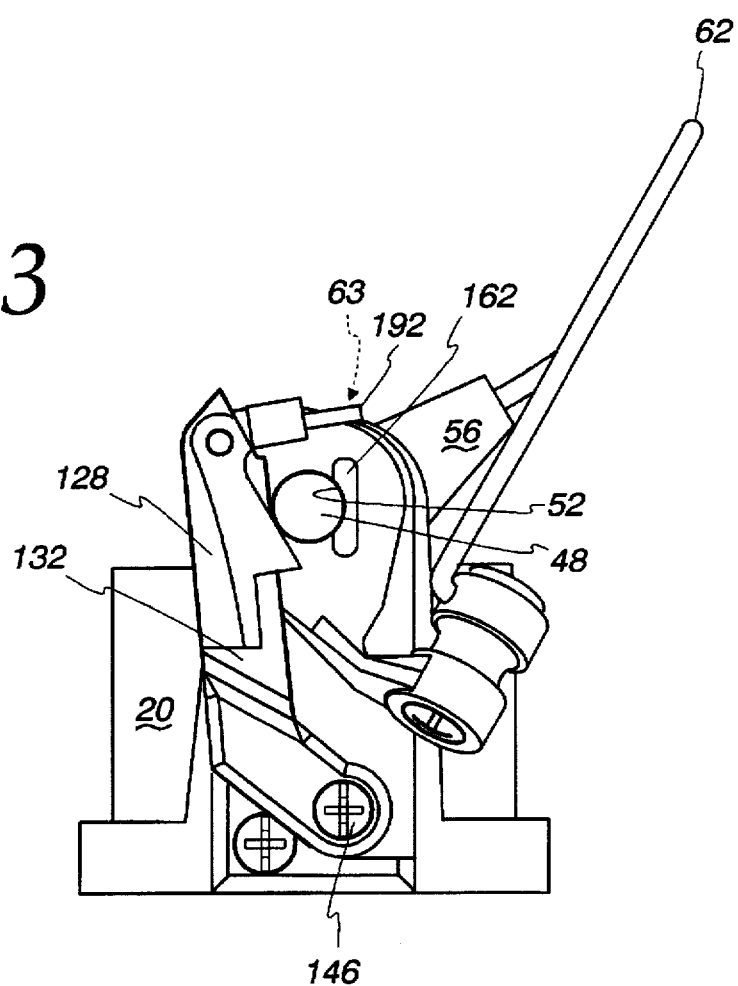
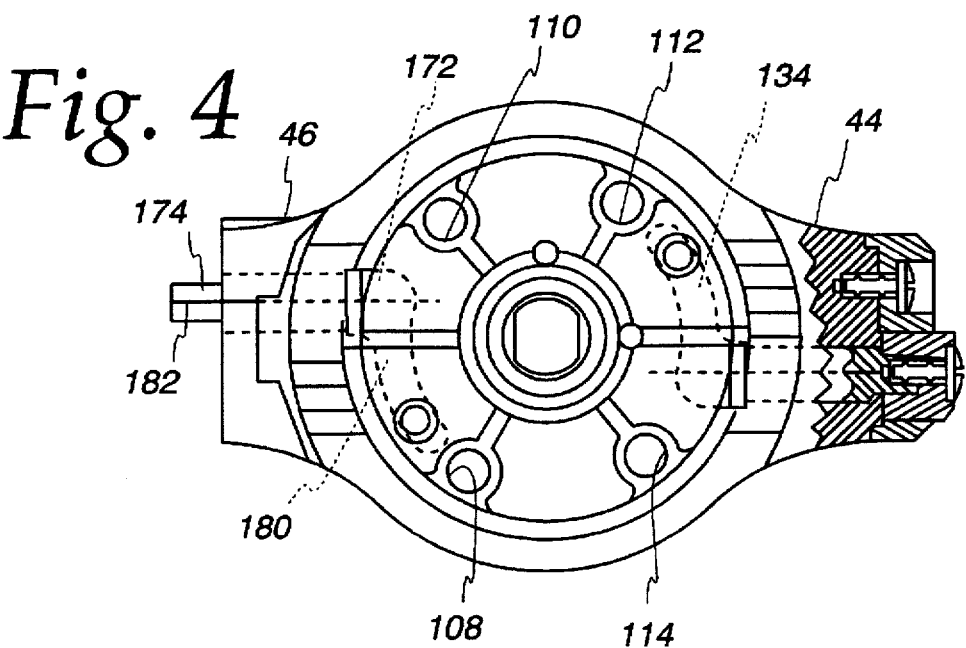

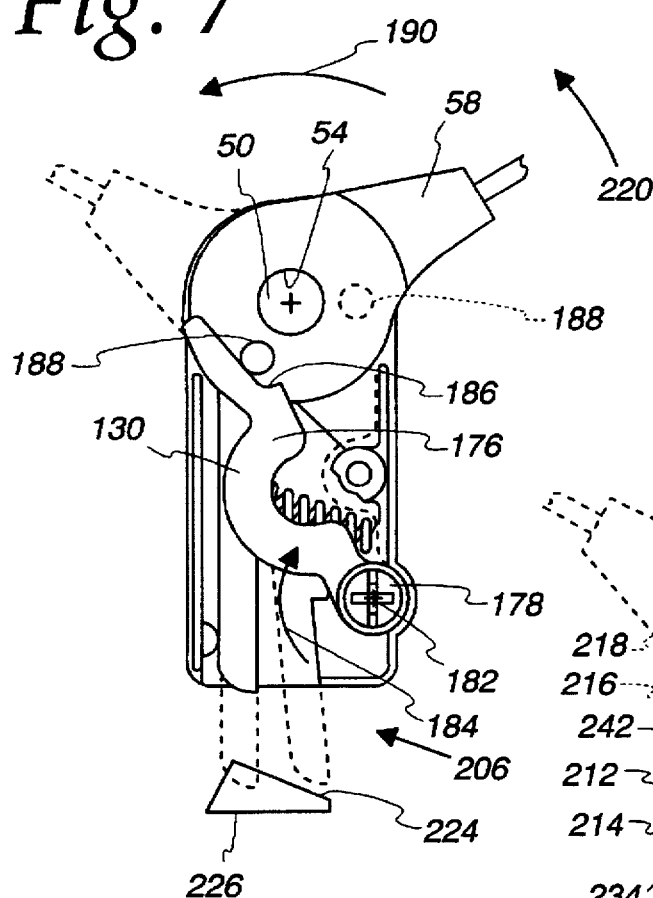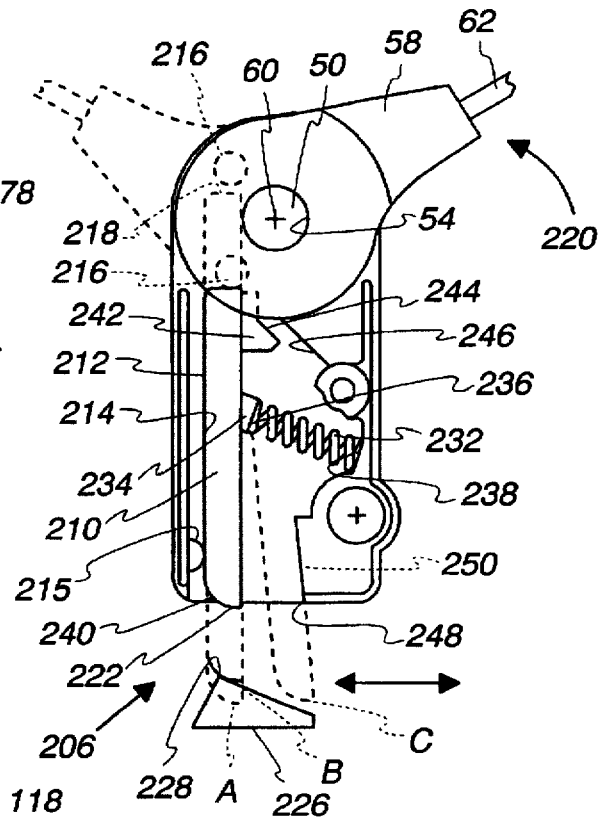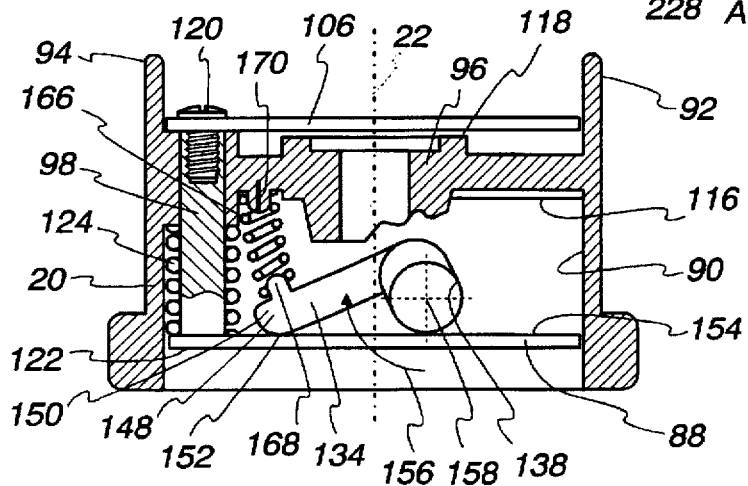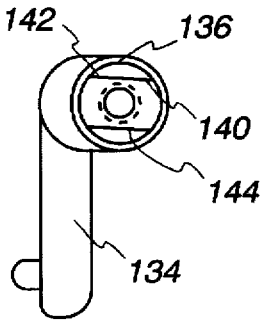

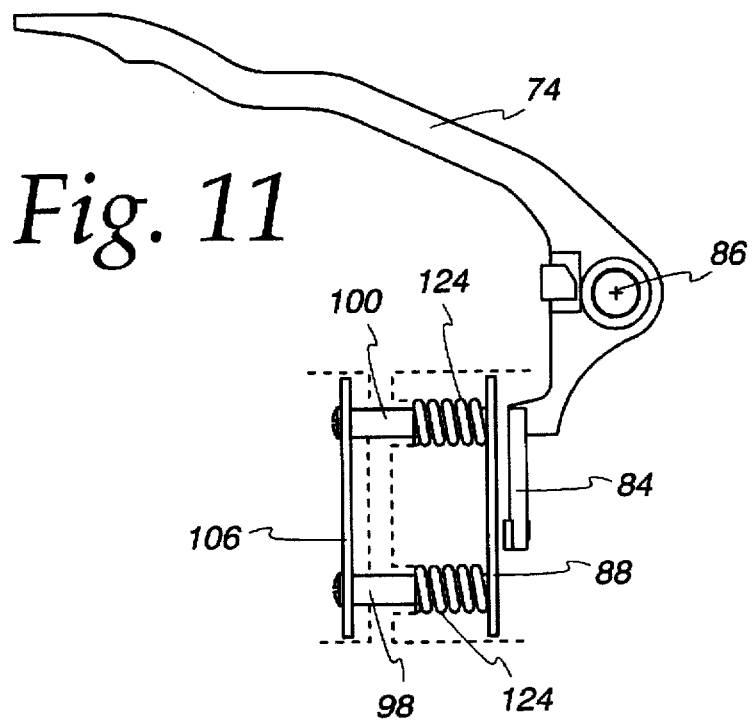
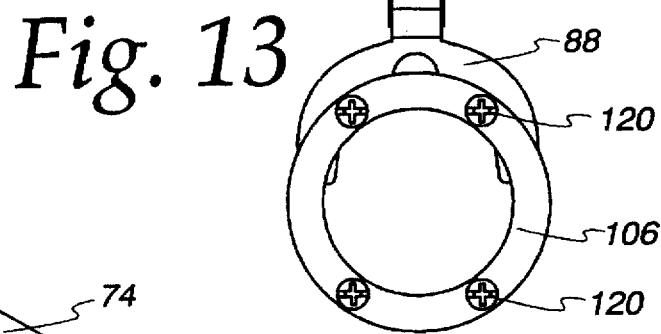
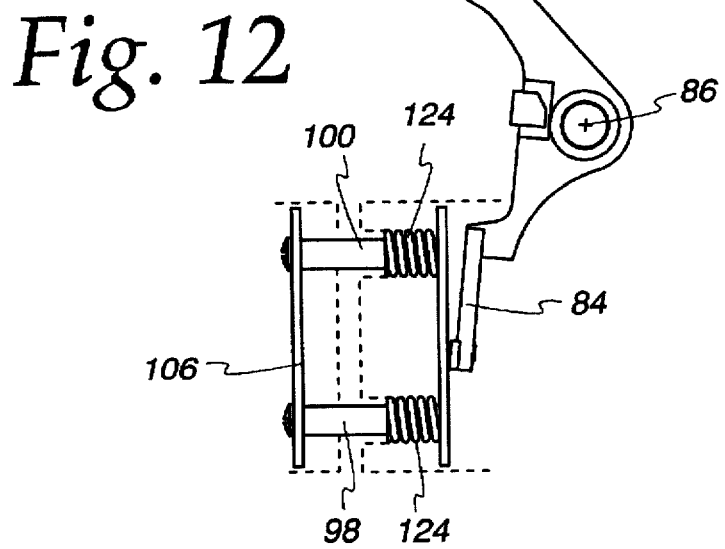

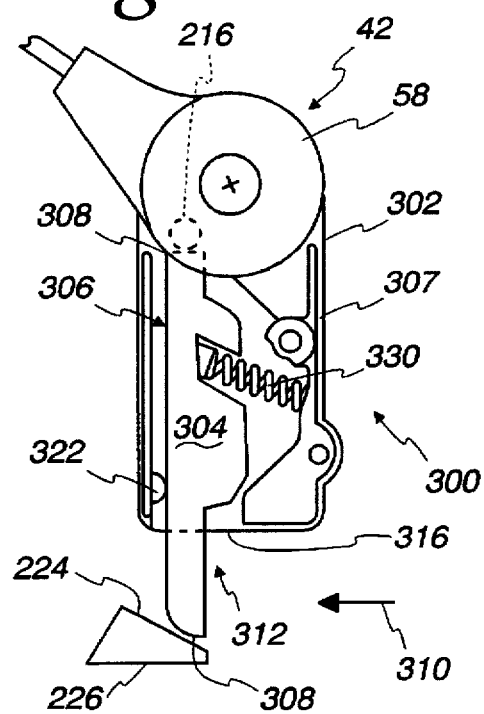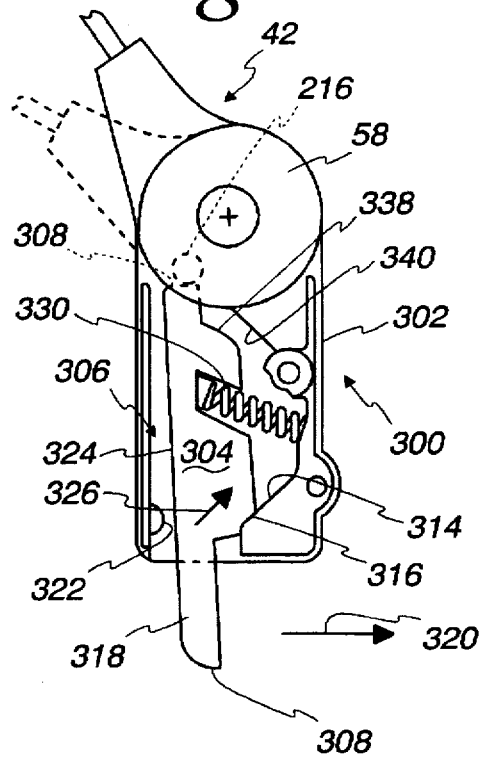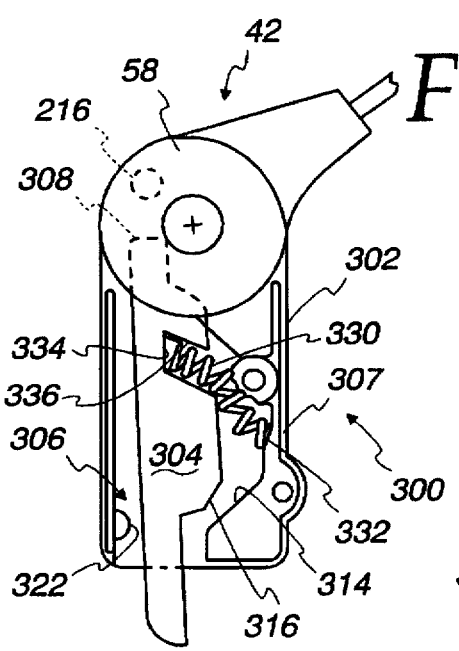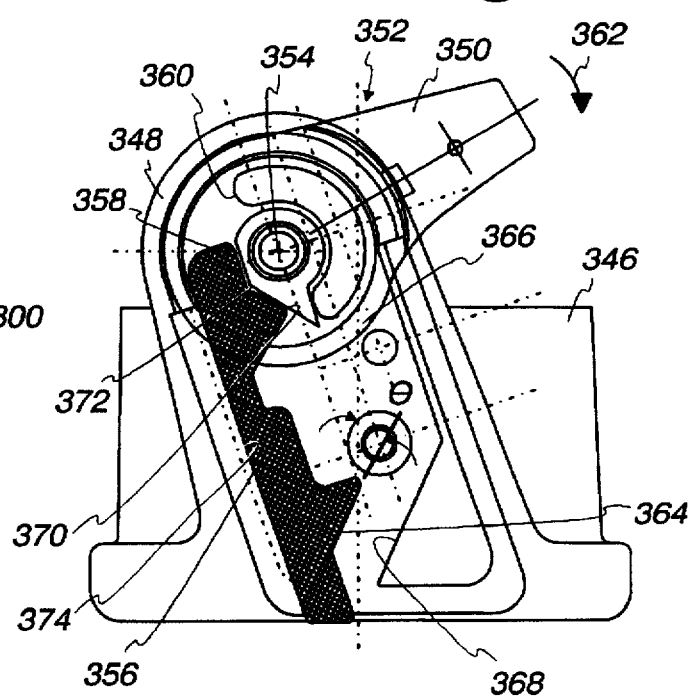

TRIP SYSTEM FOR A BAIL ASSEMBLY ON A FISHING REEL

CROSS-REFERENCE TO RELATED APPLICATION

This application is a continuation-in-part of copending application Ser. No. 07/914,260, filed Jul. 15, 1992, entitled "Anti-Jamming Mechanism for Bail Assembly on Fishing Reel".

BACKGROUND OF THE INVENTION

1. Field of the Invention

This invention relates to spinning-type fishing reels of the type having a trip mechanism, including a movable trip link, for automatically moving a bail assembly to change the fishing reel from a cast mode into a retrieve niode by rotation of a crank handle upon the completion of a east and, more particularly, to a mechanism for facilitating movement of the trip link.

2. Background Art

Spinning-type fishing reels are well known in the prior art. Typically, a spinning reel has a frame defining a mounting foot for attachment to a rod. A rotor is mounted to the frame for rotation about a fore and aft axis. A line-carrying spool is coaxial with the rotor axis and oscillated in a fore and aft direction by operation of a crank handle, which crank handle operation simultaneously rotates the rotor to thereby evenly wrap line on the line-carrying spool.

To effect a cast with a basic spinning reel, the user picks up the line projecting away from the reel, with a finger on the same hand that holds the rod, and snubs the line against the rod. With the other hand, the user manually pivots the bail assembly from a retrieve position to a cast position. The rod is then cocked and thrust in the direction of the cast. As the rod is thrust, the user moves the line snubbing finger to release the line. Once the cast is completed, the user operates the crank handle to rotate the rotor. A nip mechanism on the moving rotor is automatically actuated by a cam element on the reel frame to force the bail assembly from the cast position back into the retrieve position.

Typically, there is a camming shoulder on the reel frame to intercept a trip link on the trip mechanism. The trip link is projected rearwardly from the rotor as the reel is placed in the cast mode. Once a cast is completed and the crank handle is operated, the projecting trip link rides up the cam shoulder, forcing the bail assembly towards the retrieve position, until an overcenter mechanism drives the bail assembly fully into its retrieve position.

One difficulty with the above structure is that there is a "dead spot" with the trip link aligned over the camming shoulder. This "dead spot" is commonly existent through approximately 15° of rotation for the rotor. If the bail assembly is urged from its retrieve position towards its cast position with the trip link aligned over a high point on the cam shoulder, the bail assembly will jam. Forcing of the bail assembly may result in breakage of reel parts.

While this problem is not too severe with a fully manual bail, it poses a more serious problem with a trigger actuated bail assembly. In the case of a manual bail system, the user is already grasping the bail. A slight shift of the rotor can alleviate the problem. However, with trigger operated systems, the user ideally does not directly manipulate the bail. If the "dead spot" is encountered, the user will normally either press harder on the trigger, which may damage the reel, or have to reach under the rod and shift the rotor.

Exemplary prior an trigger mechanisms, in which the problem of "dead spots" must be contended with, are shown in each of U.S. Pat. Nos. 2,658,697, to Steinbaugh, 3,095,158, to Louison, 3,796,391, to McMickle, and 3,908,927, to Louison.

A solution to the problem of the "dead spots" is to incorporate a trip link that can be repositioned to slide transversely to the central reel axis away from the camming shoulder as the transition is made between the cast and retrieve modes. While this overcomes the jamming problem, the deflected trip link becomes forcibly pressed by the camming shoulder against a part of the rotor. A relatively large frictional force may be developed between the trip link and the rotor portion to which it abuts to thereby inhibit forward camming movement of the trip link to cause the bail assembly to move towards the retrieve position. A substantial turning force may be required on the crank handle to overcome this friction force and shift the trip link forwardly.

SUMMARY OF THE INVENTION

The present invention is specifically directed to overcoming the above enumerated problems and improving known bail operating mechanisms.

In one form of the invention, a fishing reel has a frame, a rotor, structure for mounting the rotor to the frame for rotation about a first axis, a line storage spool on the frame, structure on the rotor for directing line onto the line storage spool as an incident of the rotor being rotated about the first axis. The line directing structure includes a bail assembly having at least one bail arm, with structure for mounting the at least one bail arm to the rotor for pivoting movement between a) a first position wherein the bail assembly is in a retrieve position and b) a second position wherein the bail assembly is in a cast position. The fishing reel further includes a trip link, structure for mounting the trip link to the rotor for movement relative to the rotor between third and fourth positions, and structure cooperating between the bail assembly and trip link for moving the trip link from its third position into its fourth position as an incident of the bail assembly moving from its first position into its second position. A trip link actuator is provided on the reel frame and defines a shoulder that intercepts the trip link with the trip link in its fourth position and the rotor rotating in a first rotational direction about the first axis and urges the trip link from its fourth position towards its third position. The structure cooperating between the bail assembly and trip link includes structure for moving the bail assembly from its cast position towards its retrieve position as an incident of the trip link moving from its fourth position into its third position. The fishing reel also includes structure cooperating between the rotor and trip link for urging the trip link from its fourth position towards its third position as an incident of the trip link actuator moving against the shoulder on the reel frame as the rotor rotates in the first rotational direction.

The trip link mounting structure may include structure for allowing repositioning of the trip link relative to the rotor in the event that the trip link encounters the trip link actuator as the trip link moves from its third position towards its fourth position. This prevents jamming of the trip link by the trip link actuator and allows the trip link to move fully into its fourth position.

The structure cooperating between the rotor and trip link may be a substantially straight edge on one of the rotor and trip link that is non-parallel to the first axis and a portion on the other of the rotor and trip link for engaging the straight edge so that a camming force is developed between the substantially straight edge and portion on the other of the rotor and trip link as the trip link actuator moves against the shoulder on the reel frame as the rotor rotates in the first rotational direction, to thereby cause the trip link to be urged towards its third position.

The structure cooperating between the rotor and trip link may include substantially straight edges, one each on the rotor and trip link, which straight edges are substantially parallel to each other and non-parallel to the first axis. The camming force developed between the substantially straight edges, as the trip link actuator moves against the shoulder on the reel frame as the rotor rotates in the first rotational direction, causes the trip link to be urged towards its third position.

The structure for mounting the trip link may mount the trip link for movement in a substantially linear path parallel to the first axis between its third and fourth positions.

In one form, the rotor has an elongate guide surface and the trip link has a guide edge for engaging and moving guidingly along the rotor guide surface as the trip link moves between its third and fourth positions.

The trip link mounting structure may also include structure for normally biasing the trip link so that the trip link guide edge is biased against the rotor guide surface.

The biasing structure may be a compression element, such as a coil spring, acting between the rotor and the nip link.

In one form, the trip link has a cam edge that engages the trip link actuator and causes the trip link actuator to deflect transversely to the linear path against a force exerted by the biasing structure on the trip link upon the trip link encountering the trip link actuator in moving from its third position towards its fourth position.

In one form, the rotor has an ear to which the bail arm is mounted and the structure cooperating between the rotor and trip link includes a surface on the rotor ear to engage the trip link to urge the trip link from its fourth position towards its third position as an incident of the trip link actuator moving against the shoulder on the reel frame as the rotor rotates in the first rotational direction.

The trip link may have an elongate configuration, with spaced ends, with the substantially straight edge on the trip link residing between the spaced ends of the trip link.

In another form of the invention, a fishing reel is provided having a frame, a rotor, structure for mounting the rotor to the frame for rotation about a first axis, a line storage spool on the frame, and structure on the rotor for directing line onto the line storage spool as an incident of the rotor being rotated about the first axis. The line directing structure includes a bail assembly having at least one bail arm with structure for mounting the at least one bail arm to the rotor for pivoting movement between a) a first position wherein the bail assembly is in a retrieve position and b) a second position wherein the bail assembly is in a cast position. The fishing reel has a trip link, with structure for mounting the trip link to the rotor for movement relative to the rotor between third and fourth positions. Structure cooperates between the frame and trip link for urging the trip link from its fourth position towards its third position as an incident of the rotor rotating about the first axis with the trip link in its fourth position. Structure cooperates between the bail assembly and trip link for moving the bail assembly from its cast position towards its retrieve position as an incident of the trip link moving from the fourth position into the third position. The fishing reel further has structure cooperating between the rotor and nip link for urging the trip link from its fourth position towards its third position as an incident of the structure cooperating between the frame and trip link urging the trip link from its fourth position towards its third position.

Cooperating structure can be provided on the bail assembly and trip link for releasably maintaining the trip link in its third position.

BRIEF DESCRIPTION OF THE DRAWINGS

FIG. 3 is a view as in FIG. 2 with a line carrying spool removed and a force transmission arm pivoted to expose structure cooperating between the force transmission arm and the bail assembly;

FIG. 4 is an enlarged, rear elevation view of the rotor;

FIG. 7 is an enlarged, side elevation view of one bail arm on the bail assembly in relationship to one of two force transmission arms used to effect rotation of the bail assembly and further showing a trip mechanism, according to the present invention, for preventing jamming of the bail assembly as it moves from a retrieve position to a cast position;

FIG. 8 is a view as in FIG. 7 with the force transmission arm removed;

FIG. 9 is a sectional view of the rotor showing a translatable plate assembly for transmitting an operating force from a trigger to the force transmission arms;

FIG. 10 is a side elevation view of an internal part of one of the force transmission arms;

FIG. 11 is an isolated, side elevation view of the trigger in relationship to the plate assembly and with the trigger in a rest position;

FIG. 12 is a view as in FIG. 11 with the trigger in an operating position;

FIG. 13 is a front elevation view of the trigger and plate assembly.

FIG. 20 is a side elevation view of one bail arm on a bail assembly with a modified form of trip mechanism for the bail assembly, according to the present invention, and with the bail assembly in a casting position;

FIG. 21 is a view as in FIG. 20 with the bail assembly in transition between the casting position and the retrieve position;

FIG. 22 is a view as in FIGS. 20 and 21 with the bail assembly in the retrieve position; and FIG. 23 is a side elevation view of a rotor with a further modified form of trip mechanism for the bail assembly, according to the present invention, thereon.

DETAILED DESCRIPTION OF THE DRAWINGS

Figure 1:
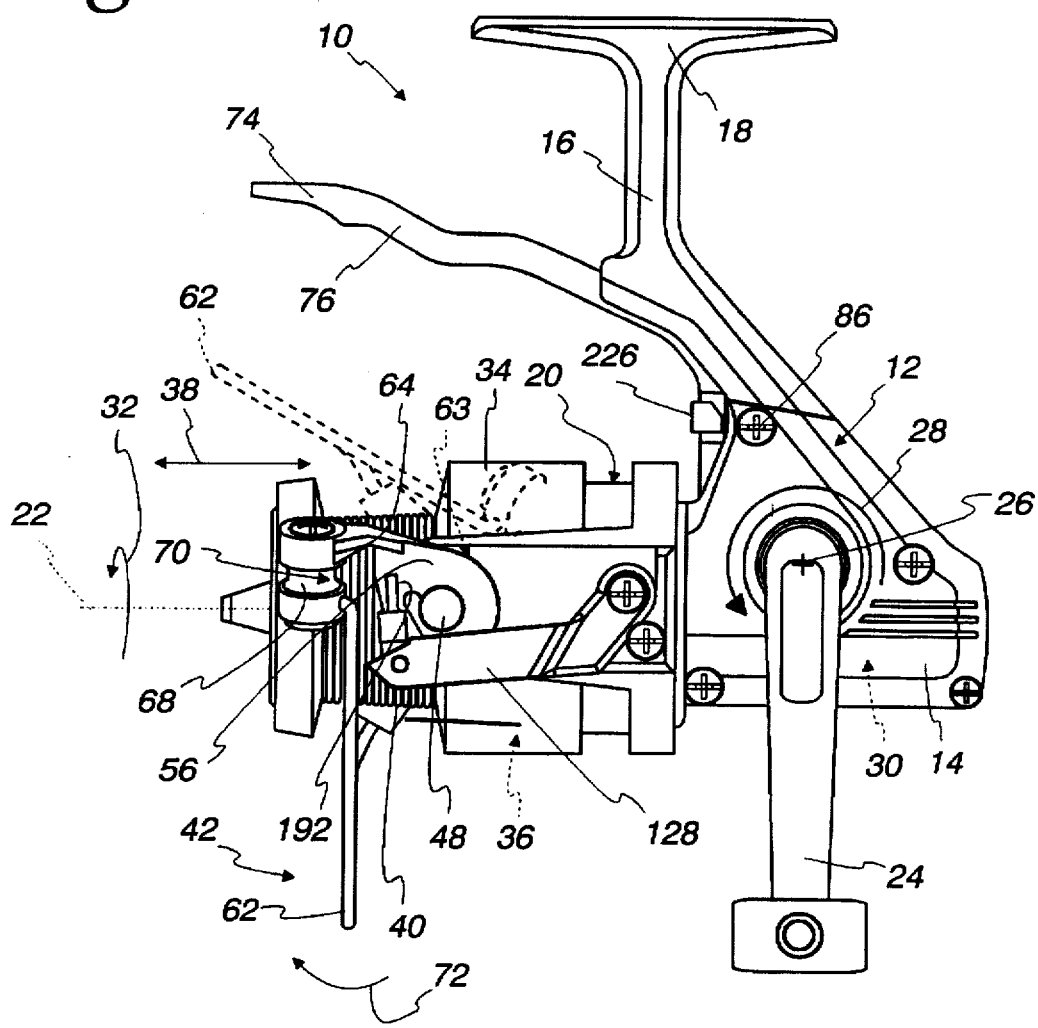
FIG. 1 is a side elevation view of a spinning-type fishing reel incorporating a bail assembly operating mechanism according to the present invention.

In FIGS. 1–13, a spinning-type fishing reel is shown at 10 having incorporated therein a preferred form of bail operating mechanism according to the present invention. Before the details of the invention are described, the overall reel operation will be briefly described to set the environment for the present invention.

The spinning reel 10 has a frame 12 with a housing 14 that contains the internal operating mechanism for the reel 10. A detailed description of the reel operating mechanism is unnecessary to understand the present invention. A detailed description of the operating mechanism is given in U.S. Pat. No. 4,676,450, which is incorporated herein by reference.

The frame housing 14 extends upwardly to define a mounting stem 16, which terminates in a mounting foot 18 that can be attached to a fishing rod (not shown) in conventional fashion.

The frame 12 carries a rotor 20 at its forward end. The rotor 20 is mounted to the frame 12 for rotation about a fore and aft axis 22. Rotation is imparted to the rotor 20 by a crank handle 24. Rotation of the crank handle 24 about a laterally extending axis 26 in the direction of arrow 28, through an internal operating mechanism, shown generally at 30 in FIG. 1, effects rotation of the rotor 20 about the axis 22 in the direction of arrow 32, i.e. in a clockwise direction as viewed from the front of the reel 10.

The rotor 20 is configured to direct line onto a line carrying spool 34 in a wrapping motion. An internal oscillating mechanism shown generally at 36, also operated by the crank handle 24, moves the spool 34 in a reciprocating fore and aft path, as indicated by the double-headed arrow 38, so that line 40 is distributed evenly along the length of the line carrying spool 34.

Line 40 is wrapped around the spool 34 by a bail assembly at 42. The bail assembly 42 is attached to the rotor 20 and, more particularly, to mounting ears 44,46 at diametrically opposite locations on the rotor 20. The mounting ears 44,46 have laterally outwardly extending mounting posts 48,50 which project into through bores 52,54 on bail arms 56,58, respectively, to thereby support the bail arms 56,58 for pivoting movement about a common axis 60. A U-shaped bail wire 62 has its ends connected to the bail arms 56,58 so that the bail arms 56,58 and bail wire 62 rotate as a unit between the retrieve position, shown in solid lines in FIG. 1, and the cast position, shown in phantom lines in that same figure. An overcenter bias structure, shown generally at 63 in FIGS. 1 and 3, drives the bail assembly into each of the cast and retrieve positions as the bail assembly approaches each. Suitable overcenter bias structures are well known to to those skilled in the art.

The bail arm 56 has a line receptacle 64 defined cooperatively by a wall 66 on the bail arm 56 and a line roller 68. The receptacle 64 is generally U-shaped and opens in the direction of advancement of the rotor 20 during line retrieval.

The line 40 normally projects from the spool 34 through an opening 70 defined at the juncture of the wall 66 and line roller 68. The line roller 68 guides line 40 that is paying out as the spool 34 rotates with the rotor 20 stationary, as when a fish overcomes the normal drag force exerted on the spool 34. As the rotor 20 is rotated in the direction of arrow 32, to real eve the line 40, the line 40 slides down the line roller 68 and into the receptacle 64, whereupon the wall 66 and/or line roller 68 draws the line 40 around the oscillating spool 34.

Figure 2:
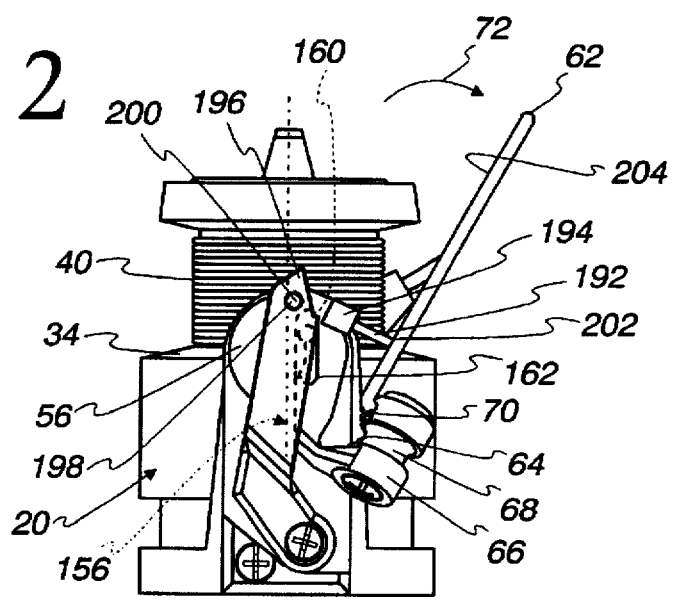
FIG. 2 is an enlarged, side elevation view of a rotor on the reel in FIG. 1 with the bail assembly thereon in a cast position.
Figure 5:
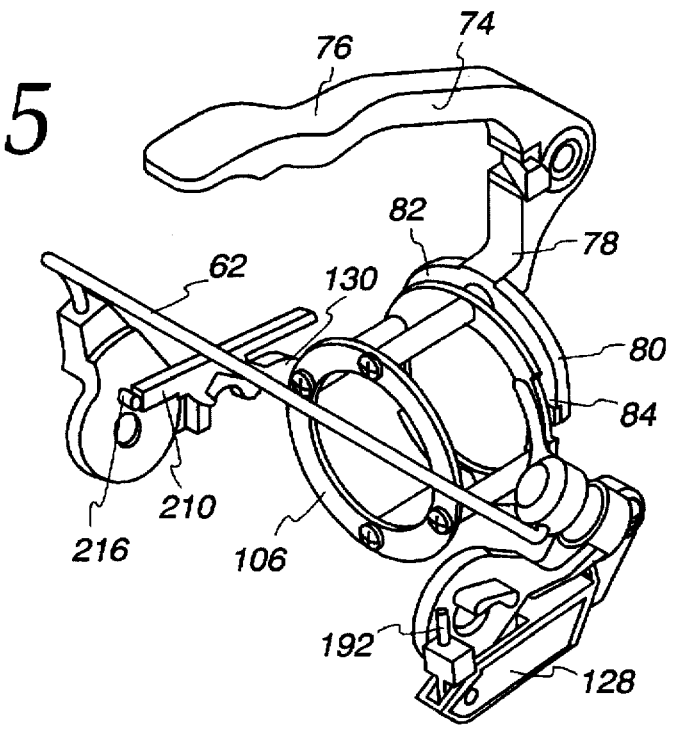
FIG. 5 is an isolated perspective view of the bail operating mechanism, according to the present invention, in a cast mode.
Figure 6:
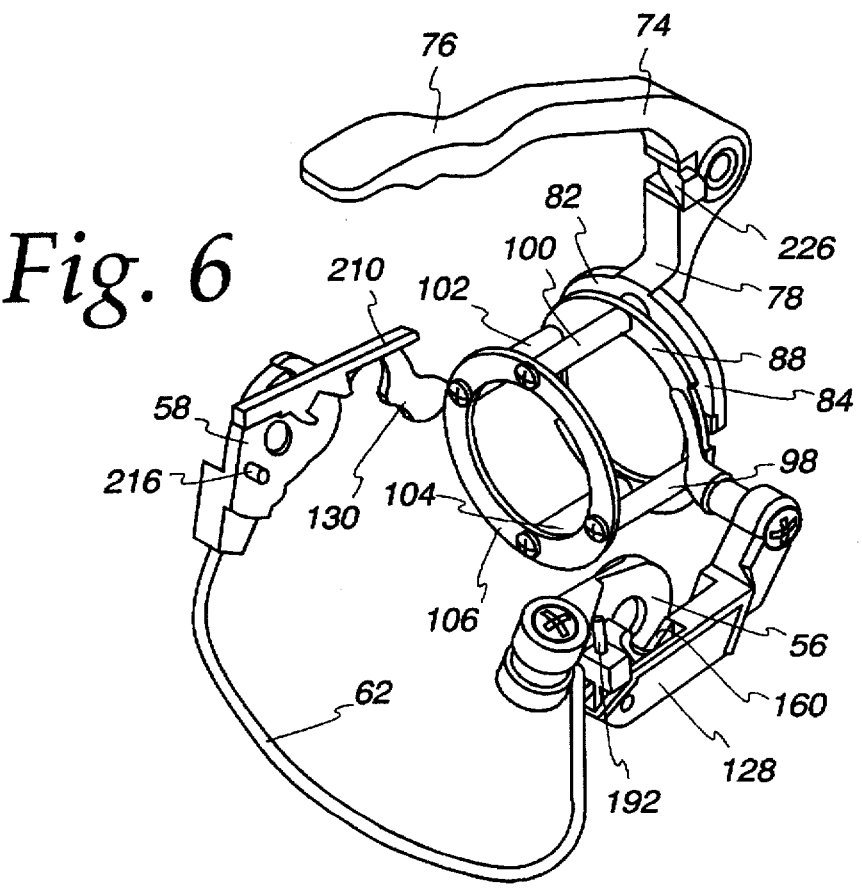
FIG. 6 is a view as in FIG. 5 with the bail operating mechanism in a retrieve mode.

By pivoting the bail assembly 42 in the direction of the arrow 72 in FIGS. 1 and 2, the bail assembly 42 is placed in the cast position. In the cast position, the line 40 is allowed to freely pay off of the spool 34. Once the desired amount of line 40 is paid out, the crank handle 24 is operated to automatically reposition the bail assembly 42 in the retrieve position through a mechanism according to the invention, that will be described in detail below.

The reel includes a mechanism for placing the bail assembly 42 into the cast position from the retrieve position therefor and for causing the bail assembly 42 to automatically move back into the retrieve position at the completion of the cast upon operation of the crank handle 24.

The reel has a bail assembly actuator in the form of a trigger 74. The trigger 74 has an overall "L" shape with an elongate forwardly projecting finger engaging portion 76 and a transverse bail actuating portion 78. The bail actuating portion 78 terminates in a U-shaped yoke 80 with spaced legs 82,84. The trigger 74 is mounted to the time 12 by a pin 86 for pivoting movement about a laterally extending axis between a rest position, shown in FIGS. 1 and 6, and an operating position, shown in FIG. 5. The trigger 74 is spring loaded towards its rest position.

Drawing up on the finger actuating portion 76 of the trigger 74, and moving the trigger 74 from its rest position to its operating position, advances the legs 82,84 forwardly into engagement with an armular, actuation plate 88. The actuation plate 88 operates within an internal space 90 defined by an armular wall 92 on the body 94 of the rotor 20. A mounting wall 96 serves as a support for the actuation plate 88 and guides movement of the actuation plate in a fore and aft direction.

The actuation plate 88 is connected to four guide posts 98, 100,102,104, which are spaced equidistantly around the circumference of the actuation plate 88. The preferred means for interconnecting the guide posts 98,100, 102,104 and actuation plate 88 is described below. The guide posts 98,100, 102, 104 are of equal length, elongate and project substantially parallel to each other in a fore and aft direction, i.e. parallel to the center axis of the actuation plate 88.

To stabilize the posts 98, 100, 102, 104, an armular reinforcement plate 106, having a configuration similar to the plate 88, is mounted to the free ends of the posts 98,100, 102, 104. The plates 88,106 and posts 98,100, 102, 104 together define a unitary plate assembly.

Prior to assembly of the reinforcement plate 106, the posts 98,100, 102, 104 are directed through bores 108, 110, 112, 114, consecutively, from the rearwardly facing side 116 of the wall 96, until the posts 98,100,102, 104 project beyond the front, forwardly facing surface 118 of the wall 96. Once the reinforcement plate 106 is attached to the posts 98,100, 102,104, as by screws 120, the wall 96 is held captive between the actuation and reinforcement plates 88,106.

In one form, the posts 98, 100, 102, 104 have a circular cross section taken transversely to their length. The bores 108, 110, 112, 114 have a corresponding cross section to accept and guide the posts 98,100,102,104 in a fore and aft direction. This described guide arrangement assures that the movement of the entire plate assembly is consistently linear in a fore and aft line. The trigger legs 82,84 act on the rearwardly facing surface 122 of the plate 88 at diametrically opposite locations thereon to distribute the bail operating force from the trigger substantially uniformly across the plate 88 and avoid canting of the plate assembly.

The actuation plate 88 is normally biased in a rearward direction. This is accomplished by providing springs 124 (two shown) around each of the posts 98,100, 102,104 so that the springs 124 act between the rewardly facing surface 116 of the wall 96 and the actuation plate 88.

As the actuation plate 88 is translated forwardly from a retracted position into an extended position by the trigger 74, the actuation plate 88 acts against and simultaneously pivots the force transmission arms 128,130 to cause the force transmission arms 128,130 to drive their associated bail arms 56,58 into their cast position.

The transmission arm 128 consists of first and second joinable parts 132,134. The transmission arm part 132 is situated eternally of the reel whereas the transmission arm part 134 is located primarily within the rotor space 90. The arm part 134 has a cylindrical shaft 136 that projects fully through a bore 138 in the rotor wall 92 to be exposed externally of the rotor body 94. The exposed portion 140 of the arm part 134 has flats 142, 144 to make keyed connection with a correspondingly configured bore in the arm part 132. A screw 146 maintains the coupled arrangement of the arm parts 132, 134 through the rotor wall 92.

The arm part 134 has an elongate, curved extension 148 projecting transversely to the length of the shaft 136. The free end 150 of the extension 148 has a curved cam edge 152 which abuts to the forwardly facing surface 154 on the actuation plate 88. As the actuation plate moves from its retracted position into its extended position, the actuation plate 88 effects rotation of the extension 148, and the arm part 132 keyed thereto, in the direction of the arrow 156 about the axis 158 of the shaft 136.

As the extension 134 is pivoted by the actuation plate 88, a shoulder 160 on the arm part 132 is brought to bear against a kidney-shaped pin/projection 162 on the bail arm, which is offset radially outwardly and forwardly from the pivot axis 60 for the bail arm 56. Pivoting of the arm part 132 exerts a force on the bail assembly 42 to pivot the same in the direction of the arrow 72 towards a cast position.

A coil spring 166 acts between the wall 96 and free end 150 of the extension 148 to normally bias the force transmission arm 128 oppositely to the direction of the arrow 156. Bosses 168,170 are provided on the wall 96 and extension 134, respectively, to penetrate and maintain the coil spring 166 in position.

The force transmission arm 130 has a similar two-part construction including an arm part 172 within the rotor space 90 and having a keyed projection 174 to mate with an arm part 176 externally of the rotor. A screw 178 maintains the keyed connection of the arm parts 172, 176.

The arm part 172 has an extension 180 that is acted upon by the actuation plate 88 to effect rotation of the arm part 176 about the axis 182 of the projection 174 on the arm part 172. A similar spring biasing structure (not shown) biases the extension 180 normally into contact with the actuation plate 88.

Forward movement of the actuation plate 80 pivots the arm 130 about the axis 182 in the direction of arrow 184. A shoulder 186 on the arm 130 engages a pin 188 on bail arm 56. With the bail arm 58 in the solid line, retrieve position shown in FIG. 7, the pin 188 resides axially rearwardly of the bail assembly pivot axis 60. Pivoting of the arm 130 in the direction of the arrow 184 effects a counterpivoting of the bail arm 58 in the direction of the arrow 190.

The arms 130, 132 pivot oppositely to each other about their respective axes 182,158. The axes 158, 182 are parallel to but slightly offset from each other.

A further aspect of the invention is to configure the pins 162,188 and shoulders 160, 186 so that there is a slight lag in operation of the pin 162 and shoulder 160 upon the trigger 74 being actuated. The pin 188 and shoulder 186 are relatively situated with the reel in a retrieve mode so that upon the actuating plate 88 moving forwardly, the shoulder 186 is abutted to the pin 188 and optimally oriented to develop a large torque on the bail arm 58. This large force that is produced as the bail assembly 42 is moved from a stationary position is often compromised in conventional structures to add to the pivot range. Once the bail arm 58 pivots in the direction of the arrow 190 a predetermined amount, the shoulder 160 confronts the pin 162. The pin 162 and shoulder 160 are configured to allow the arm 128 to positively drive the bail arm 56 fully into the retrieve position of FIG. 2. In the absence of this arrangement, the shoulders 160,186 and pins 162, 188 would have to be configured to all simultaneously coact, in which event the pivoting range for the bail assembly 42 would be limited to the range permitted by each pin and shoulder. Normally this range is on the order of 120° and difficult to achieve effectively with the conventional construction, given the normal space constraints and manufacturing tolerances. As noted above, this conventional construction compromises the initial force that moves the bail assembly 42 from the stationary retrieve position. With the staggered arrangement, the pivot range can be extended without sacrificing the necessary starting force.

This feature is particularly desirable with reels incorporating a line holding pin 192. The pin 192 projects in cantilever fashion from an L-shaped support arm 194 pivotably mounted to the free end 196 of the arm 128 for rotation about an axis 198 defined by a mounting pin 200. As the arm 128 drives the bail arm 56 into the cast position, the pin free end 202 abuts the edge 204 of the bail wire 62 to thereby block the line in the receptacle 64. Reserve travel for the bail assembly is built into the pin 162 and shoulder 160 arrangement to allow positive clamping of the pin free end 202 to the bail wire edge 204 so that the forces during casting do not overcome the clamping force of the line holding pin 192 that might cause premature line release.

With the inventive structure, pulling up on the trigger 74 moves the bail assembly 42 from the retrieve position into the cast position therefor. At the same time, the pin 192 blocks the line in the line receptacle 64, thereby obviating the need to snub the line 40 against a rod as the rod and reel are cocked in preparation for a cast. To complete the cast, the rod and reel 10 are thrust forwardly and simultaneously the trigger 74 is released. Upon release of the trigger 74, the arm 128 pivots under the force of the spring 166 to back the pin 192 off of the bail wire 62 to allow the line 40 to pay freely off of the spool 34.

Another significant aspect of the present invention is that the bail assembly 42 is movable through the trigger 74 from the retrieve position into the cast position regardless of the rotational position of the bail assembly 42. Thus, no self-centering mechanism is necessary, as is common on prior art reels which have a trigger that is operable in only a very small range of positions. The user need not concern him or herself with the position of the bail assembly 42 with the inventive structure.

Another aspect of the present invention is a novel mechanism at 206 to prevent jamming of the bail assembly 42 as it moves from the retrieve position to the cast position and for returning the bail assembly 42 from the cast position to the retrieve position upon rotation of the crank handle 24 at the completion of a cast.

A trip link 210 cooperates with the bail arm 58 and is movable thereby from the solid line retracted position in FIGS. 7 and 8 to the extended phantom line positions, as the bail assembly moves from its retrieve position into its cast position.

The trip link 210 has a substantially straight edge 212 which engages and is guided along a straight guide surface 214 defined by the rotor 20. Alternatively, a dimple 215 can be used to guide translatory movement of the trip link 210. Preferably, the edge 212 and sin-face 214 are straight so that the trip link 210 moves linearly between the solid line position and the phantom line position. It is not necessary, however, that the predetermined path followed by the trip link 210 be linear.

The bail arm 58 has an inwardly projecting pin 216 that engages and drives one trip link end 218 as the bail assembly 42 rotates in the direction of the arrow 220 in FIGS. 7 and 8. Upon the bail assembly 42 being placed in the cast position, the opposite free end 222 of the trip link 210 projects to the phantom position A, shown in FIG. 8. Once the cast is completed, the user rotates the crank handle 24, which bears the extended trip link end 222 against a shoulder/ramp surface 224 on a trip link actuator 226 mounted on the trigger 74, as shown in FIG. 1.

The reel includes a mechanism for allowing at least a portion of the trip link 210 to be deflected out of its predetermined path so that the trip link will not jam with the actuator 226. In the absence of this mechanism, there is a "dead spot" where the bail assembly 42 cannot be automatically actuated. More specifically, if the trip link free end 222 is aligned over the apex 228 of the actuator 226 as the trigger 74 is actuated, the end 222 encounters the apex 228, as seen in the phantom position B in FIG. 8, so that movement of the trip link 210 is arrested which thereby blocks movement of the bail assembly 42 fully into the cast position.

According to the invention, the trip link 210 is mounted to the rotor 20 to be repositionable, and preferably pivotable, about its free end 218 to the phantom line position C. A coil spring 232 normally biases the trip link 210 forwardly and in a clockwise direction in FIG. 8 so that the guide edge 212 and guide surface 214 are held in abutting relationship. The trip link 210 has an enlargement 234 defining a shoulder 236. The spring 232 acts between a shoulder 238 on the rotor 20 and the shoulder 236 in biasing the trip link 210 to the solid line position of FIG. 8.

The free end 222 of the trip link 210 has a convex cam edge 240 which, upon encountering the apex 228 of the trip link actuator 226, deflects the free end 222 of the trip link 210 to the right in FIGS. 7 and 8 against the bias of spring 232 under the force of the pin 216 acting on the trip link end 218. The cam edge 240 is guided down the ramp surface 224 sufficiently to allow the full extension of the trip link 210 to phantom position C as the bail assembly 42 moves into the cast position. The angle and circumferential extent of the ramp surface are selected to complement the angle that the trip link 210 must pivot through to allow the full requisite projection of the trip link 210.

A second enlargement 242 can be provided on the trip link 210 to define a shoulder 244 to abut a shoulder 246 on the rotor 20 to limit pivoting of the trip link 210 in a counterclockwise direction in FIGS. 7 and 8. Also, a shoulder 248 bounding a cutout in the rotor 20 abuts the trip link edge 250 to similarly limit pivoting movement of the trip link 210.

By operating the crank handle 24, the cam edge 240 on the trip link 210 encounters the ramp surface 224 to progressively urge the trip link 210 forwardly to thereby bear the trip link end 218 against the pin 216 to pivot the arm 58 sufficiently to allow the overcenter bias structure 63 to resituate the bail assembly 42 in the retrieve position.

The force transmission arm 130 is assembled in overlying relationship to the trip link 210. Consequently, the trip link 210 can be held captively in its operative position between the rotor 20 and the transmission arm 130. The rotor 20 and/or transmission arm 130 guide movement of the trip link between its extended and retracted positions.

Figure 14:
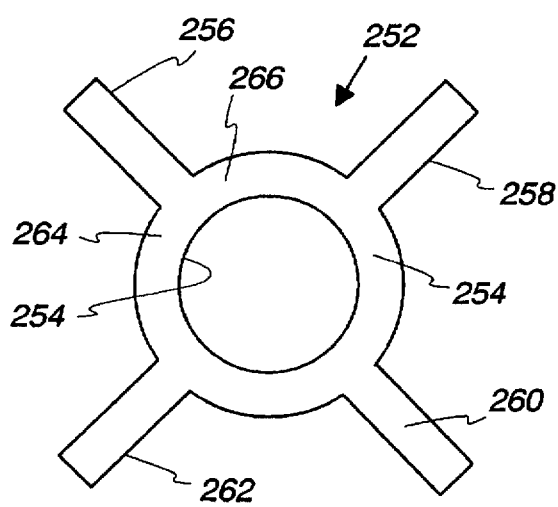
FIG. 14 is a plan view of a blank from which a unitary plate assembly can be formed.

A prefected configuration for the actuation plate assembly is shown in FIGS. 14-18. In FIG. 14, a one-piece construction for a plate assembly is shown at 252. The plate assembly consists of a single piece of sheet metal 254 that is stamped to provide a center cutout 254 and integral posts 256,258, 260,262, spaced equidistantly around the circumference of the armular center plate 264. After the stamping operation, each post 256,258,260,262 is bent through approximately 90° to project at right angles to the planar surface 266 of the plate 264.

Figure 15:
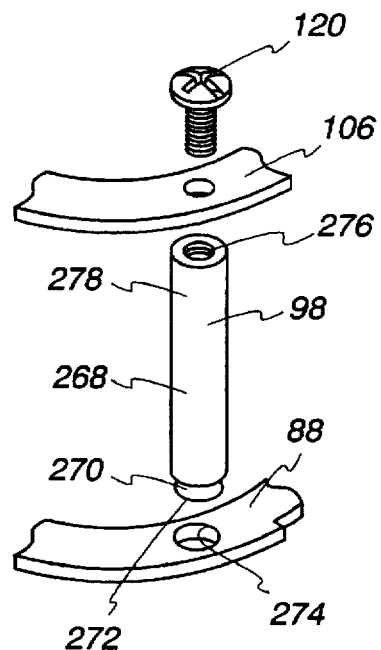
FIG. 15 is an enlarged, fragmentary, exploded perspective view of cooperating actuation and reinforcement plates and guide posts connecting therebetween according to the present invention.
Figure 16:
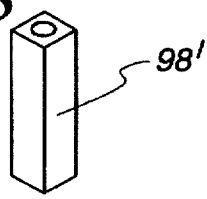
FIG. 16 is a perspective view of an alternative form of guide post on the plate assembly.
Figure 17:
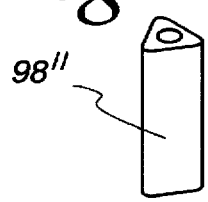
FIG. 17 is a perspective view of a further modified form of guide post according to the present invention.
Figure 18:
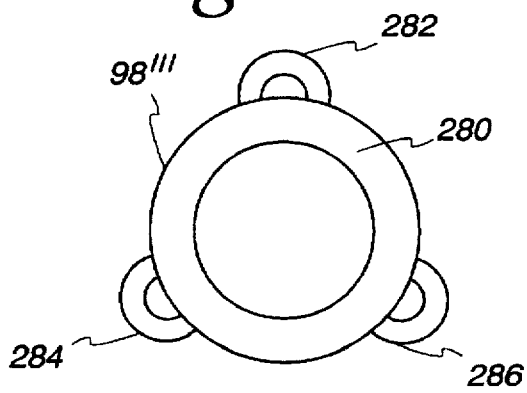
FIG. 18 is an enlarged plan view of a further modified form of guide post according to the present invention.

FIG. 15 shows a preferred means of connection between the actuation plate 88, one of the guide posts 98 and the reinforcement plate 106. The rear end 268 of the post 98 has a tapered portion 270 with a diameter that increases progressively from front to rear. The rear edge 272 of the post 98 has a diameter slightly larger than the diameter of a bore 274 in the plate 88 for reception of the post end 268. By press fitting the tapered portion 270 into the bore 274, the rear edge 272 deforms slightly and springs back with the post 98 fully seated in the plate bore 274 to effect a secure hold. A screw 120 is secured in a threaded bore 276 in the forward end 278 of the post 98.

Figure 19:
FIG. 19 is a plan view of a still further modified form of guide post according to the present invention.

FIGS. 16-19 show alternative shapes for the posts 98, 100, 102, 104. The post 98' in FIG. 16 has a rectangular cross-sectional configuration. The post 98" in FIG. 17 has a triangular cross-sectional configuration. The post 98" in FIG. 18 has a cylindrical center portion 280 and three arcuate lobes 282,284,286 spaced equidistantly around the center portion 280. In FIG. 19 a post 98"" is shown and has a diamond-shaped cross-sectional configuration. The guide bores 108, 110, 112, 114 for the posts 98,98',98",98'", 98"" have a matched cross section. However a non-matched cross section is often preferred. For example, if a triangular cross section is used in a round bore, there is contact by the post at only three points, however the guiding function is fully realized. Friction forces are thereby reduced.

The posts 98,98',98",98'",98"",100,102,104 can be made by any of a number of well known techniques, as by extrusion, molding, casting, etc. In place of the screws 120 and the tapered portion 270 that allows press fit connection, the plate assembly parts can be welded, bolted, riveted, or otherwise suitably interconnected.

For aesthetic purposes, covers (not shown) can be placed over the bail arms 56,58 and secured to the bail ears 44,46.

In FIGS. 20-22, a modified and preferred form of trip system for the bail assembly at 42, is shown at 300. The trip system 300 is assembled within a modified mounting ear 302, which pivotably accepts the mounting arm 58 on the bail assembly 42 in the same manner as previously described.

A trip link 304 is mounted within a receptacle 306 bounded by a wall 307 on the ear 302 for movement between the position shown in FIG. 20 and that shown in FIG. 22. The trip link 304 has an elongate shape with a forward free end 308 arranged to engage the pin 216 and, by forward movement thereof against the pin 216, effect pivoting of the bail assembly 42 between the cast position, shown in FIG. 20, and the retrieve position, shown in FIG. 22.

Forward shifting of the trip link 304 is effected by the actuator 226 and more particularly by the shoulder/ramp surface 224 thereon, which engages the rounded rear end 308 of the trip link 304 and progressively cams the trip link 304 forwardly as the rotor (not shown) on which the mounting ear 302 is located, rotates in the direction of the arrow 310, i.e. in a retrieve direction, in use.

It can be seen in the reel version described above, particularly in FIG. 8, that the trip link 210 will be pressed by the actuator 226 against the shoulder 248 on the rotor. This may create a substantial friction force which must be overcome to effect forward movement of the trip link 210.

According to the invention, this problem is solved by providing cooperating means at 312 on the nip link 304 and mounting ear 302 for camming the trip link 304 forwardly as it moves guidingly up the ramp surface 224. More particularly, the mounting ear 302 has a substantially straight edge/surface 314 which is angularly disposed to the fore and aft axis of the reel. The trip link 304 has a portion 316 which cooperates with the edge 314 to shift the trip link 304 forwardly as the ramp surface 224 presses the rear portion 318 of the trip link 304 in a circumferential direction, i.e. in the direction of the arrow 320. The portion 316 is preferably in the form of a substantially straight edge/surface, which has an angle substantially matched to the angle of the edge 314.

With the bail assembly 42 in the casting position of FIG. 20, rotation of the rotor on which the ear 302 is mounted in the direction of the arrow 310, brings the trip link end 308 against the ramp surface 224. The ramp surface 224 exerts a force that has both forward and circumferential components. The circumferential force component tips the rear portion 318 of the trip link 304 away from a dimple 322, which engages a straight trip link edge 324 and guides fore and aft movement of the trip link 304. As this occurs, the edges 314, 316 abut. The force produced by the actuator 226 on the trip link 304 has a component parallel to the line of the edges 314, 316, causing the surface 316 to slide in the direction of the arrow 326 relative to the surface 314. This effects a forward shifting of the trip link 304.

Once the trip link 304 reaches a full forward position, the bail assembly 42 moves into the retrieve position. The trip link 304 clears the actuator 226 whereupon a coil spring 330, in compression between a surface 332 on the ear 302 and a surface 334 in a pocket 336 on the trip link 304, drives the rear portion 318 of the trip link 304 back against the dimple 322.

It has been found that this arrangement significantly reduces the torque required on the rotor to change the reel from the cast position to the retrieve position. The spring 330 also exerts a forward force on the trip link 304 to reduce the requisite torque to be developed by the user to effect the conversion of the reel state.

The trip link 304 has a forward edge 338, which is angled with respect to the fore and aft axis of the reel and abuts to a complementary edge 340 on the ear 302 to arrest forward movement of the trip link 304.

A further variation of the inventive structure is shown on a rotor 346 in FIG. 23. The rotor 346 includes an ear 348 to which a bail arm 350 on a bail assembly 352 is mounted for pivoting movement about an axis 354. A trip link 356 has an elongate shape with a forward edge 358 that abuts to a U-shaped pin 360 on the bail arm 350 to effect pivoting movement of the bail assembly 352 in the direction of the arrow 362 to the retrieve position as the trip link 56 is advanced forwardly relative to the ear 348.

The trip link has an angled edge/surface 364 that is substantially straight and makes an angle θ of approximately 45° with the central axis 366 of the rotor 346.

The ear 348 has an edge/surface 368 that is straight and substantially parallel to the edge 364 on the trip link 346. The edges 364, 368 cooperate in the same fashion as the edges 314, 316, previously described.

The trip link 356 additionally has a nose 370 that abuts to an edge 372 on the bail arm 350 to arrest forward movement of the nip link 356. As the trip link 356 moves fully forwardly, the arm 350 moves overcenter in the direction of the arrow 362 into the retrieve position. As this occurs, the edge 372 acts against the nose 370 and squeezes the trip link 356 between the edge 372 and the guide edge 374 for the trip link 356. As a result, with the reel in the retrieve position, the trip link 356 is captively held in its forwardmost position without the need for a spring as in the previously described design.

The foregoing disclosure of specific embodiments is intended to be illustrative of the broad concepts comprehended by the invention.

We claim:

1. A fishing reel comprising:

a frame;

a rotor;

means for mounting the rotor to the frame for rotation about a first axis;

a line storage spool on the frame;

means on the rotor for directing line onto the line storage spool as an incident of the rotor being rotated about said first axis, said line directing means including a bail assembly comprising at least one bail arm and means for mounting the at least one bail arm to the rotor for pivoting movement between a) a first position wherein the bail assembly is in a retrieve position and b) a second position wherein the bail assembly is in a cast position;

a trip link;

means for mounting the trip link to the rotor for movement relative to the rotor between third and fourth positions;

means cooperating between the bail assembly and trip link for moving the trip link from its third position into a fourth position as an incident of the bail assembly moving from its first position into its second position;

a trip link actuator on the reel frame and defining a shoulder that intercepts the trip link with the trip link in its fourth position and the rotor rotating in a first rotational direction about the first axis and urges the link from its fourth position towards its third position, said means cooperating between the bail assembly and trip link including means for moving the bail assembly from its cast position towards its retrieve position as an incident of the trip link moving from its fourth position into its third position; and means cooperating between the rotor and trip link for producing a force on the trip link to urge the trip link axially relative to the first axis from its fourth position towards its third position as an incident of the trip link actuator moving against the shoulder on the reel frame as the rotor rotates in the first rotational direction.

2. The fishing reel according to claim 1 wherein the trip link mounting means includes means for allowing repositioning of the trip link relative to the rotor in the event that the trip link encounters the trip link actuator as the trip link moves from its third position towards its fourth position to thereby prevent jamming of the trip link by the trip link actuator and allow the trip link to move fully into its fourth position.

3. The fishing reel according to claim 1 wherein the means cooperating between the rotor and trip link comprises a substantially straight edge on one of the rotor and trip link that is non-parallel to the first axis and a portion on the other of the rotor and trip link for engaging the straight edge so that a camming force is developed between the substantially straight edge and portion on the other of the rotor and trip link as the trip link actuator moves against the shoulder on the reel frame as the rotor rotates in the first rotational direction to thereby cause the trip link to be urged towards its third position.

4. The fishing reel according to claim 1 wherein the means cooperating between the rotor and trip link comprises substantially straight edges, one each on the rotor and trip link, said straight edges being substantially parallel to each other and non-parallel to the first axis, whereby a camming force is developed between the substantially straight edges as the trip link actuator moves against the shoulder on the reel frame as the rotor rotates in the first rotational direction to thereby cause the trip link to be urged towards its third position.

5. The fishing reel according to claim 4 wherein the trip link has an elongate configuration with spaced ends and the substantially straight edge in the trip link resides between the spaced ends of the trip link.

6. The fishing reel according to claim 1 wherein the rotor has an elongate guide surface and the nip link has a guide edge for engaging and moving guidingly along the rotor guide surface as the trip link moves between its third and fourth positions.

7. The fishing reel according to claim 6 wherein the trip link mounting means includes means for normally biasing the trip link so that the trip link guide edge is biased against the rotor guide surface.

8. The fishing reel according to claim 7 wherein the biasing means comprises a compression element acting between the rotor and the trip link.

9. The fishing reel according to claim 8 wherein the compression element comprises a coil spring.

10. The fishing reel according to claim 7 wherein the trip link has a cam edge that engages the trip link actuator and causes the trip link actuator to deflect transversely to the first axis against a force exerted by the biasing means on the trip link upon the trip link encountering the trip link actuator in moving from its third position towards its fourth position.

11. The fishing reel according to claim 1 wherein the rotor has an ear to which the bail arm is mounted and the means cooperating between the rotor and trip link includes a surface on the rotor ear to engage the trip link to urge the trip link from its fourth position towards its third position as an incident of the trip link actuator moving against the shoulder on the reel frame as the rotor rotates in the first rotational direction.

12. A fishing reel comprising:
a frame;
a rotor;
means for mounting the rotor to the frame for rotation about a first axis;
a line storage spool on the frame;
means on the rotor for directing line onto the line storage spool as an incident of the rotor being rotated about said first axis,
said line directing means including a bail assembly comprising at least one bail arm and means for mounting the at least one bail arm to the rotor for pivoting movement between a) a first position wherein the bail assembly is in a retrieve position and b) a second position wherein the bail assembly is in a cast position;
a trip link;
means for mounting the trip link to the rotor for movement relative to the rotor between third and fourth positions;
means cooperating between the frame and trip link for urging the trip link from its fourth position towards its third position as an incident of the rotor rotating about the first axis with the trip link in its fourth position;
means cooperating between the bail assembly and trip link for moving the bail assembly from its cast position towards its retrieve position as an incident of the trip link moving from the fourth position into the third position; and
means cooperating between the rotor and trip link for producing a force on the trip link to urge the trip link axially relative to the first axis from its fourth position towards its third position as an incident of the means cooperating between the frame and trip link urging the trip link from its fourth position towards its third position.

13. The fishing reel according to claim 12 wherein the means cooperating between the rotor and trip link comprises a substantially straight edge on one of the rotor and trip link that is non-parallel to the first axis and a portion on the other of the rotor and trip link for engaging the straight edge so that a camming force is developed between the substantially straight edge and portion on the other of the rotor and trip link as the trip link actuator moves against the shoulder on the reel frame as the rotor rotates in the first rotational direction to thereby cause the trip link to be urged towards its third position.

14. The fishing reel according to claim 12 wherein the means cooperating between the rotor and trip link comprises substantially straight edges, one each on the rotor and trip link, said straight edges being substantially parallel to each other and non-parallel to the first axis, whereby a camming force is developed between the substantially straight edges as the trip link actuator moves against the shoulder on the reel frame as the rotor rotates in the first rotational direction to thereby cause the trip link to be urged towards its third position.

15. The fishing reel according to claim 12 wherein the rotor has an elongate guide surface and the trip link has a guide edge for engaging and moving guidingly along the rotor guide surface as the trip link moves between its third and fourth positions.

16. The fishing reel according to claim 15 wherein the trip link mounting means includes means for normally biasing the trip link so that the trip link guide edge is biased against the rotor guide surface.

17. The fishing reel according to claim 16 wherein the trip link has a cam edge that engages the trip link actuator and causes the trip link actuator to deflect transversely to the first axis against a force exerted by the biasing means on the trip link upon the trip link encountering the trip link actuator in moving from its third position towards its fourth position.

18. The fishing reel according to claim 12 wherein the rotor has an ear to which the bail arm is mounted and the means cooperating between the rotor and trip link includes a surface on the rotor ear to engage the trip link to urge the trip link from its fourth position towards its third position as an incident of the trip link actuator moving against the shoulder on the reel frame as the rotor rotates in the first rotational direction.

19. The fishing reel according to claim 18 wherein the trip link has an elongate configuration with spaced ends and the substantially straight edge resides between the spaced ends of the trip link.

20. The fishing reel according to claim 12 wherein there are means cooperating between the bail assembly and trip link for releasably maintaining the trip link in its third position.

* * * * *